United States Patent
Chen et al.

(10) Patent No.: US 12,231,910 B1
(45) Date of Patent: Feb. 18, 2025

(54) METHOD AND WIRELESS EXTENDER FOR OPERATING IN A WIRELESS FREQUENCY BAND AND COMPUTER PROGRAM PRODUCT

(71) Applicant: TP-Link Systems Inc., Irvine, CA (US)

(72) Inventors: Jiaxin Chen, Shenzhen (CN); Jianxin Liao, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/808,119

(22) Filed: Aug. 19, 2024

(51) Int. Cl.
*H04W 16/26* (2009.01)
*H04W 76/15* (2018.01)

(52) U.S. Cl.
CPC .......... *H04W 16/26* (2013.01); *H04W 76/15* (2018.02)

(58) Field of Classification Search
CPC ............................. H04W 16/26; H04W 76/15
See application file for complete search history.

(56) References Cited

U.S. PATENT DOCUMENTS

| | | | | |
|---|---|---|---|---|
| 6,654,616 B1* | 11/2003 | Pope, Jr. | ............... | H04W 88/08 455/445 |
| 10,565,841 B2* | 2/2020 | Emmanuel | ............ | H04W 4/029 |
| 11,871,242 B2* | 1/2024 | Mahoney | ............. | H04B 17/318 |
| 2005/0124294 A1* | 6/2005 | Wentink | ............ | H04W 72/1263 455/41.2 |
| 2013/0329583 A1* | 12/2013 | Vrzic | .................. | H04W 36/302 370/252 |
| 2013/0329694 A1* | 12/2013 | Vrzic | ................ | H04W 36/0066 370/331 |
| 2014/0229994 A1* | 8/2014 | Fell | ..................... | H04N 21/8186 725/54 |
| 2015/0249928 A1* | 9/2015 | Alicot | ................... | G06F 9/4416 370/315 |
| 2016/0050340 A1* | 2/2016 | Rubio | ................... | G06F 3/1238 358/1.14 |
| 2016/0249378 A1* | 8/2016 | Zhou | ................. | H04W 72/1268 |
| 2017/0055159 A1* | 2/2017 | Boppana | .................. | H04B 1/40 |
| 2017/0181006 A1* | 6/2017 | Vardarajan | ............ | H04W 16/26 |
| 2019/0320250 A1* | 10/2019 | Hoole | .................... | H04J 3/1652 |
| 2019/0373675 A1* | 12/2019 | Chari | ..................... | H04W 88/04 |

(Continued)

FOREIGN PATENT DOCUMENTS

| | | |
|---|---|---|
| CN | 101729123 A | 6/2010 |
| CN | 109587734 A | 4/2019 |
| CN | 115395965 B | 5/2023 |

*Primary Examiner* — Hassan A Phillips
*Assistant Examiner* — Prenell P Jones
(74) *Attorney, Agent, or Firm* — Loeb & Loeb LLP (57) ABSTRACT

This disclosure provides a method of operating a wireless extender in a wireless frequency band, a corresponding wireless extender and a computer program product. The wireless extender can include a first radio and a second radio. The method can include: controlling a first station (STA) interface of the first radio and a second STA interface of the second radio to connect to a router in response to determining that a connection state of the first STA interface and a connection state of the second STA interface are both disconnected; controlling the second STA interface to stop connecting to the router in response to determining that the first STA interface has connected to the router; and disabling a first access point (AP) interface of the first radio and enabling a second AP interface of the second radio.

20 Claims, 4 Drawing Sheets

(56) References Cited

U.S. PATENT DOCUMENTS

| | | | | |
|---|---|---|---|---|
| 2019/0387415 A1* | 12/2019 | Scahill | ................ | H04W 16/26 |
| 2020/0169894 A1* | 5/2020 | Dillon | ................... | H04W 16/18 |
| 2021/0391876 A1* | 12/2021 | Wheelock | ............. | H04B 1/005 |
| 2022/0022063 A1* | 1/2022 | Ganapathy | ......... | H04B 7/15507 |
| 2022/0150721 A1* | 5/2022 | Zebulon | ............... | H04L 1/0015 |
| 2022/0201511 A1* | 6/2022 | Chen | ..................... | H04W 8/005 |
| 2022/0225152 A1* | 7/2022 | Schultz | ................ | H04W 72/51 |
| 2022/0303870 A1* | 9/2022 | Tian | ..................... | H04W 48/06 |
| 2022/0311563 A1* | 9/2022 | Tao | ...................... | H04B 7/0452 |
| 2023/0224711 A1* | 7/2023 | Strater | ................. | H04W 52/42 |
| | | | | 726/4 |
| 2024/0196384 A1* | 6/2024 | Clancy | ............. | H04W 72/0453 |

\* cited by examiner

METHOD AND WIRELESS EXTENDER FOR OPERATING IN A WIRELESS FREQUENCY BAND AND COMPUTER PROGRAM PRODUCT

TECHNICAL FIELD

The present disclosure relates to wireless communication, and more specifically, to a method and a wireless extender for operating in a wireless frequency band and a corresponding computer program product.

BACKGROUND

A wireless extender is a network device that transmits signals from one network device to another. It is mainly used to extend network coverage and enhance signal strength. At present, dual-band wireless extenders can use two frequency bands, namely 2.4 GHz and 5 GHZ, for communication.

Figure 1:
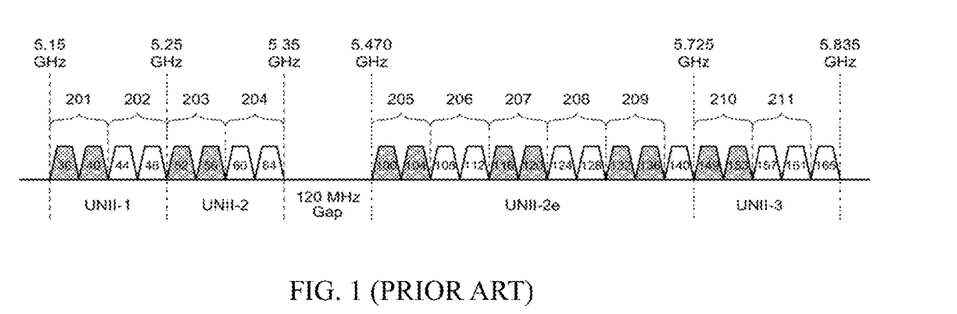
FIG. 1 is a frequency spectrum diagram depicting an example 5 GHz frequency band of an existing technology.

FIG. 1 is a frequency spectrum diagram 100 depicting a prior technology example 5 GHz frequency band. The 5 GHz frequency band ranges from 5.15 GHz to 5.835 GHz and may be subdivided into a number of Unlicensed National Information Infrastructure (UNII) radio bands. For example, the usable sub-bands in the 5 GHz frequency band (e.g., as defined by IEEE 802.11 standards) may include a UNII-1 sub-band (e.g., 5.15-5.25 GHz), a UNII-2 sub-band (e.g., 5.25-5.35 GHZ), a UNII-2e sub-band (e.g., 5.470-5.725 GHz), and a UNII-3 sub-band (e.g., 5.725-5.835 GHz). Each of the sub-bands includes a number of 20 MHz channels (e.g., channels 36-165). The 20 MHz channels may be grouped (e.g., paired) with one another to form eleven 40 MHz channels (e.g., channels 201-211). A 120 MHz wide frequency band or gap exists between the UNII-2 sub-band and the UNII-2e sub-band (e.g., 5.35-5.47 GHZ); wireless communications are restricted in this 120 MHz wide frequency region.

The use of 6 GHz frequency band, which ranges from 5.925 GHz to 7.125 GHz (e.g., channels 1-233), in wireless communication is also being studied and under development.

SUMMARY

The present disclosure provides techniques for a wireless extender to operate in a wireless frequency band efficiently. In particular, the present disclosure provides a method of operating a wireless extender in a wireless frequency band, a corresponding wireless extender and a computer program product. Through the techniques described herein, the wireless extender can establish a connection with a router automatically, which is particularly useful in a scenario that a channel used by the router changes and the wireless extender is in turn disconnected from the router or in a scenario that the wireless extender hasn't initially connected to the router. The wireless extender can use different ranges of frequencies of the wireless frequency band for communicating with the router and one or more stations respectively, which improves frequency band utilization rate and the forwarding rate of the wireless extender.

According to an aspect of the present disclosure, there is provided a method of operating a wireless extender in a wireless frequency band. The wireless extender can comprise a first radio operating in a first range of frequencies of the wireless frequency band and a second radio operating in a second range of frequencies of the wireless frequency band. The method can be performed by the wireless extender and can comprise: controlling a first station (STA) interface of the first radio and a second STA interface of the second radio to connect to a router in response to determining that a connection state of the first STA interface and a connection state of the second STA interface are both disconnected; controlling the second STA interface to stop connecting to the router in response to determining that the first STA interface has connected to the router; and disabling a first access point (AP) interface of the first radio and enabling a second AP interface of the second radio.

In some embodiments, the method can further comprise: controlling the second STA interface to disconnect from the router in response to determining that both the first STA interface and the second STA interface have connected to the router.

In some embodiments, the method can further comprise: obtaining backhaul information of the router; disabling a first backhaul interface of the first radio and a second backhaul interface of the second radio; controlling the first STA interface and the second STA interface to reconnect to the router using the backhaul information; controlling the second STA interface to stop reconnecting to the router in response to determining that the first STA interface has reconnected to the router using the backhaul information; and enabling the first backhaul interface and the first AP interface.

In some embodiments, the method can further comprise: sending roaming information to one or more stations connected to the first AP interface to request the one or more stations to connect to the second AP interface.

In some embodiments, the method can further comprise: obtaining backhaul information of the router; disabling a first backhaul interface of the first radio and a second backhaul interface of the second radio; controlling the first STA interface and the second STA interface to reconnect to the router using the backhaul information; controlling the first STA interface to stop reconnecting to the router in response to determining that the second STA interface has reconnected to the router using the backhaul information; and enabling the second backhaul interface and the first AP interface.

In some embodiments, the method can further comprise: sending roaming information to one or more stations connected to the second AP interface to request the one or more stations to connect to the first AP interface.

In some embodiments, the wireless frequency band can be a 5 GHz wireless frequency band or a 6 GHz wireless frequency band.

In some embodiments, the first range of frequencies can comprise Unlicensed National Information Infrastructure (UNII) radio bands UNII-1 and UNII-2, and the second range of frequencies can comprise UNII radio bands UNII-2e and UNII-3.

In some embodiments, the wireless extender can comprise a third radio operating in another wireless frequency band and the method can further comprise: controlling a third STA interface of the third radio to connect to the router or enabling a third AP interface of the third radio.

In some embodiments, each of the first backhaul interface and the second backhaul interface can be used for backhaul connection by another wireless extender.

According to another aspect of the present disclosure, there is provided a wireless extender configured to operate in a wireless frequency band. The wireless extender can comprise: a first radio operating in a first range of frequencies of the wireless frequency band; a second radio operating in a second range of frequencies of the wireless frequency band; one or more processors; a memory coupled to at least one of the processors; and a set of computer program instructions stored in the memory, which, when executed by at least one of the processors, perform the following actions: controlling a first station (STA) interface of the first radio and a second STA interface of the second radio to connect to a router in response to determining that a connection state of the first STA interface and a connection state of the second STA interface are both disconnected; controlling the second STA interface to stop connecting to the router in response to determining that the first STA interface has connected to the router; and disabling a first access point (AP) interface of the first radio and enabling a second AP interface of the second radio.

According to yet another aspect of the present disclosure, there is provided a method of operating a wireless extender in a wireless frequency band. The wireless extender can comprise a first radio operating in a first range of frequencies of the wireless frequency band and a second radio operating in a second range of frequencies of the wireless frequency band. The method can be performed by the wireless extender and can comprise: obtaining backhaul information recorded in the wireless extender; disabling a first backhaul interface of the first radio and a second backhaul interface of the second radio; controlling a first station (STA) interface of the first radio and a second STA interface of the second radio to connect to a router using the backhaul information; controlling the second STA interface to stop connecting to the router in response to determining that the first STA interface has connected to the router using the backhaul information; enabling the first backhaul interface, a first access point (AP) interface of the first radio and a second AP interface of the second radio; and sending roaming information to one or more stations connected to the first AP interface to request the one or more stations to connect to the second AP interface.

According to still yet another aspect of the present disclosure, there is provided a wireless extender configured to operate in a wireless frequency band. The wireless extender can comprise: a first radio operating in a first range of frequencies of the wireless frequency band; a second radio operating in a second range of frequencies of the wireless frequency band; one or more processors; a memory coupled to at least one of the processors; and a set of computer program instructions stored in the memory, which, when executed by at least one of the processors, perform the following actions: obtaining backhaul information recorded in the wireless extender; disabling a first backhaul interface of the first radio and a second backhaul interface of the second radio; controlling a first station (STA) interface of the first radio and a second STA interface of the second radio to connect to a router using the backhaul information; controlling the second STA interface to stop connecting to the router in response to determining that the first STA interface has connected to the router using the backhaul information; enabling the first backhaul interface, a first access point (AP) interface of the first radio and a second AP interface of the second radio; and sending roaming information to one or more stations connected to the first AP interface to request the one or more stations to connect to the second AP interface.

According to still yet another aspect of the present disclosure, there is provided a computer program product for operating a wireless extender in a wireless frequency band. The wireless extender can comprise a first radio operating in a first range of frequencies of the wireless frequency band and a second radio operating in a second range of frequen-cies of the wireless frequency band. The computer program product can comprise a non-transitory computer readable storage medium having program instructions embodied therewith, the program instructions are executable by a processor of the wireless extender to cause the processor to perform any one of the above methods.

At least based on the above embodiments of the present disclosure, a wireless extender can establish a connection with a router automatically, which is particularly useful in a scenario that a channel used by the router changes and the wireless extender is in turn disconnected from the router or in a scenario that the wireless extender hasn't initially connected to the router. In addition, the wireless extender can use different ranges of frequencies of the wireless frequency band for communicating with the router and one or more stations respectively, and therefore frequency band utilization rate can be improved, thereby improving the forwarding rate of the wireless extender.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of said word encompasses those ones listed following the said word and their equivalents, without excluding other elements or objects.

In addition, technical features involved in different embodiments of the present disclosure described below may be combined with each other as long as no conflicts occur therebetween.

As described above, the total available bandwidth in the 5 GHz frequency band is relatively large, and therefore dividing the 5 GHz frequency band into two sub-bands for communicating with an upper node and a lower node respectively may improve frequency band utilization rate. At present, for initial configuration of a wireless extender, a user needs to manually select a first sub-band from the two sub-bands for the wireless extender to use to connect to a router, and manually set a second sub-band of the two sub-bands for the wireless extender to use to connect to one or more stations (for example, one or more of a cell phone, a tablet device, a laptop computer, or the like). The wireless extender may operate in a channel in the first sub-band to receive data from and transmit data to the router, and may operate in a channel in the second sub-band to receive data from and transmit data to the one or more stations. However, the router may change the channel it uses for communication for certain reasons, for example, the user may switch the channel for the router, or the channel may be changed through automatic channel selection (ACS), so as to select an idle channel for communication. The wireless extender may then be disconnected from the router, and the user will have to reset the wireless extender manually in order for it to continue to function properly. For example, assuming the wireless extender is operating on channel 36 to communicate data with the router, and the router switches to channel 149 for certain reasons at a particular moment. The wireless extender will then be disconnected from the router, and the user will have to reset the sub-band that the wireless extender uses to connect to the router, so that the wireless extender can reestablish connection with the router and function properly. This affects the continuity of data transmission and the whole process brings great inconvenience and burden to users.

In addition, wireless extenders may support wireless distribution system (WDS) mode, and there is no effective approach at present for wireless extenders in the WDS mode to establish connections with each other automatically. Furthermore, in the WDS mode, if the one or more stations roam in the wireless environment, there is no effective approach at present to ensure uninterrupted service for a station, which for example switches from communicating data with the router to communicating data with a wireless extender during the roaming. For example, similar to what is described above, the router may communicate data with the lower node through a first channel in the first sub-band or first range of frequencies. The lower node herein may include a first station and a first wireless extender. The first wireless extender may communicate data with the router through the first channel and communicate data with one or more stations through a second channel in the second sub-band or second range of frequencies. The first station is initially connected to the router and using the first channel for data transmission. At a certain time, the first station may roam to a different position where it is better for the first station to connect to the first wireless extender for subsequent data communication or transmission. However, since the first wireless extender communicates data with one or more stations through the second channel, the first station may not be able to successfully connect to the first wireless extender, and there will be an interruption of service for the first station. It should be noted that although the roaming station is described above as the first station herein, it is not intended that only one station is roaming, but to represent an existence of at least one station, and there may be one or more stations that roam and undergo the interruption of service just as the first station.

In view of the above problems, the present disclosure provides a method of operating a wireless extender in a wireless frequency band, a corresponding wireless extender and a computer program product. Through the techniques described herein, the wireless extender can establish a connection with a router automatically, which is particularly useful in a scenario that a channel used by the router changes and the wireless extender is in turn disconnected from the router or in a scenario that the wireless extender hasn't initially connected to the router. The wireless extender can use different ranges of frequencies of the wireless frequency band for communicating with the router and one or more stations respectively, which improves frequency band utilization rate and the forwarding rate of the wireless extender. In some further embodiments, the method, wireless extender and computer program product can support the scenario of WDS mode and station roaming, enabling wireless extenders in the WDS mode to establish connections with each other automatically and ensuring uninterrupted service for a station which undergoes roaming.

The following descriptions will be made with reference to FIG. 2 and FIG. 3. It is shown a schematic diagram 200 of a scenario to which an embodiment of the present disclosure can be applied in FIG. 2, and it is shown a flowchart of a method 300 of operating a wireless extender in a wireless frequency band according to an embodiment of the present disclosure. The method 300 in FIG. 3 can be performed by the wireless extender in FIG. 2.

It should be noted that in the following, the wireless frequency band in which the wireless extender is operating is assumed to be 5 GHz frequency band in the context for ease of illustration and description, and the skilled can understand that the wireless frequency band can also be the 6 GHz frequency band or another frequency band, and the description regarding the 5 GHz frequency band can also apply to the 6 GHz frequency band or another frequency band.

Figure 2:
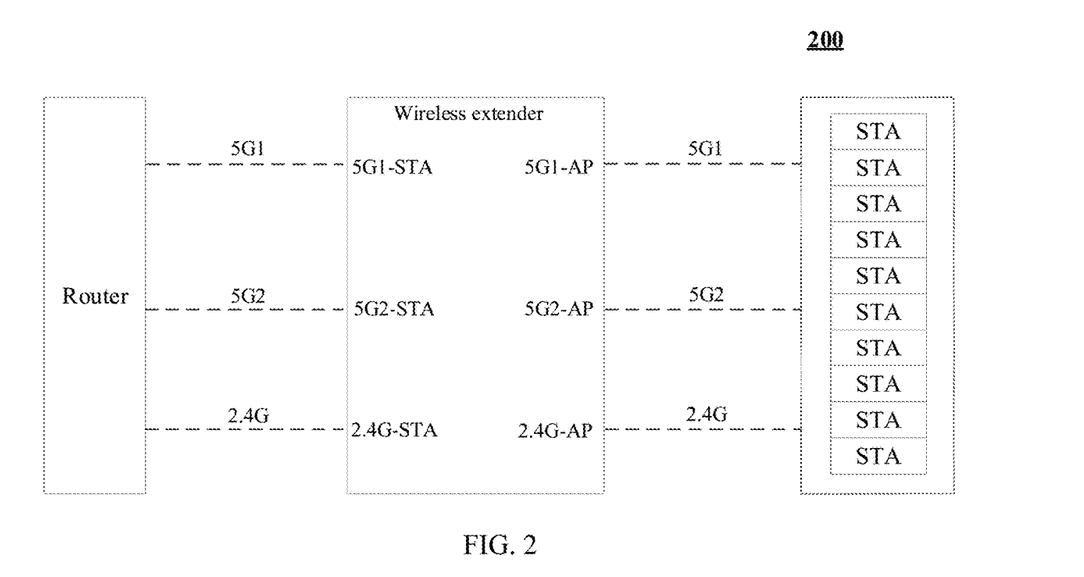
FIG. 2 shows a schematic diagram of a scenario to which an embodiment of the present disclosure can be applied.

In the context of 5 GHz frequency band, the wireless extender may comprise a first radio operating in a first range of frequencies of the wireless frequency band, shown as 5G1 in FIG. 2. The wireless extender may also comprise a second radio operating in a second range of frequencies of the wireless frequency band, shown as 5G2 in FIG. 2. The first range of frequencies, 5G1, may comprise Unlicensed National Information Infrastructure (UNII) radio bands UNII-1 and UNII-2, for example, channels 36 to 64, as shown in FIG. 1. The second range of frequencies, 5G2, may comprise UNII radio bands UNII-2e and UNII-3, for example, channels 100 to 165, as shown in FIG. 1.

As shown in in FIG. 2, the first radio may comprise a first station (STA) interface, shown as 5G1-STA in FIG. 2, for connection to an upper node. The upper node may be, for example, the router as shown in FIG. 2. The first radio may also comprise a first access point (AP) interface, shown as 5G1-AP in FIG. 2, for connection to a lower node. Similarly, the second radio may comprise a second STA interface, shown as 5G2-STA in FIG. 2, for connection to the upper node, and a second AP interface, shown as 5G2-AP in FIG.

2, for connection by the lower node. The lower node may be, for example, one or more stations (STAs) as shown in FIG. 2. Each of the one or more stations may be any suitable Wi-Fi enabled wireless device including, for example, a cell phone, personal digital assistant (PDA), tablet device, laptop computer, or the like. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The method 300 can performed by the wireless extender.

At step 310, a first STA interface (5G1-STA) of the first radio and a second STA interface (5G2-STA) of the second radio can be controlled to connect to the router in response to determining that a connection state of the first STA interface (5G1-STA) and a connection state of the second STA interface (5G2-STA) are both disconnected. The connection state of the first STA interface (5G1-STA) may be connected or disconnected from the router. Similarly, the connection state of the second STA interface (5G2-STA) may be connected or disconnected from the router. The condition that both the two STA interfaces are disconnected from the router may correspond to the above scenario that a channel used by the router changes and the wireless extender is in turn disconnected from the router or the scenario that the wireless extender hasn't initially connected to the router. In the present disclosure, the connection states of the two radios (i.e., the first and second STA interfaces) to the router can be determined, so that if it is determined that neither of the two radios is connected to the router, the first STA interface (5G1-STA) and the second STA interface (5G2-STA) may be controlled to connect to the router at the same time to see which one will get connected first, and therefore a connection can be established automatically. Establishing a connection automatically is particularly useful in the scenario that a channel used by the router changes and the wireless extender is in turn disconnected from the router or in the scenario that the wireless extender hasn't initially connected to the router, and reduces the burdens of the user for manually establishing the connection. Furthermore, the connection states of the two radios (i.e., the first and second STA interfaces) to the router may facilitate the wireless extender to use different ranges of frequencies of the wireless frequency band for communicating with the router and one or more stations respectively, so as to improve frequency band utilization rate and the forwarding rate of the wireless extender. For example, if it is determined that one of the two radios is connected to the router and the other one of the two radios is disconnected from the router, the one radio that is connected can be used for data transmission between the wireless extender and the router, while the other one of the two radios that is disconnected can be used for data transmission between the wireless extender and the one or more STAs. In some embodiments, controlling the first STA interface and the second STA interface to connect to the router may be based on a service set identifier (SSID) and an encryption credential of the router. The encryption credential referred to herein may include for example an encryption mode and/or a password used by the router.

At step 320, the second STA interface can be controlled to stop connecting to the router in response to determining that the first STA interface has connected to the router. Since it is intended to use one radio for upper communication (i.e., data transmission between the wireless extender and the router) and one radio for lower communication (i.e., data transmission between the wireless extender and the one or more STAs), once it is determined one STA interface among the two STA interfaces has connected to the router, the connected STA interface can be used for the upper communication with the router. The other STA interface, which has not connected to the router, no longer needs to try to connect to the router, and therefore can be controlled to stop connecting to the router. The AP interface of the radio which comprises the disconnected STA interface can be used for the lower communication with the one or more STAs. Although it is described at step 320 that it is the first STA interface which has connected to the router, the skilled in the art can understand it can also be the second STA interface which has connected to the router, in which case the first STA interface can be controlled to stop connecting to the router.

In some embodiments, both the first STA interface and the second STA interface may have connected to the router. In this case, the second STA interface can be controlled to disconnect from the router. Although it is described herein that it is the second STA interface which is controlled to disconnect from the router, the skilled in the art can understand it can also be the first STA interface which is controlled to disconnect from the router, as long as only one of the first and second radios are used for the upper communication, and the other one of the radios can be used for the lower communication.

At step 330, the first AP interface (5G1-AP) can be disabled and the second AP interface (5G2-AP) can be enabled. According to step 320, it is the first STA interface which has connected to the router, therefore the first radio can be used for the upper communication and the second radio can be used for the lower communication. Accordingly, the first AP interface (5G1-AP) of the first radio for lower communication can be disabled and the second AP interface (5G2-AP) of the second radio for lower communication can be enabled.

The wireless extender can further operate in another frequency band, for example, the 2.4 GHz frequency band, in addition to the above-mentioned wireless frequency band, and the another frequency band can be used by the wireless extender for either upper communication or lower communication. Therefore, in some embodiments, the wireless extender can comprise a third radio operating in another wireless frequency band and the method 300 can further comprise a step 340. At step 340, a third STA interface of the third radio can be controlled to connect to the router so that the third radio is used for upper communication with the router, or a third AP interface of the third radio can be enabled so that the third radio is used for lower communication with the one or more STAs. It should be appreciated that although step 340 is illustrated in FIG. 3 as subsequent to step 330, it may be performed at any stage of the method 300, for example, before or after step 310, before or after step 320, before or after step 330, as the third radio operates in a frequency band different from the frequency bands in which the first and second radios operates.

Figure 3:
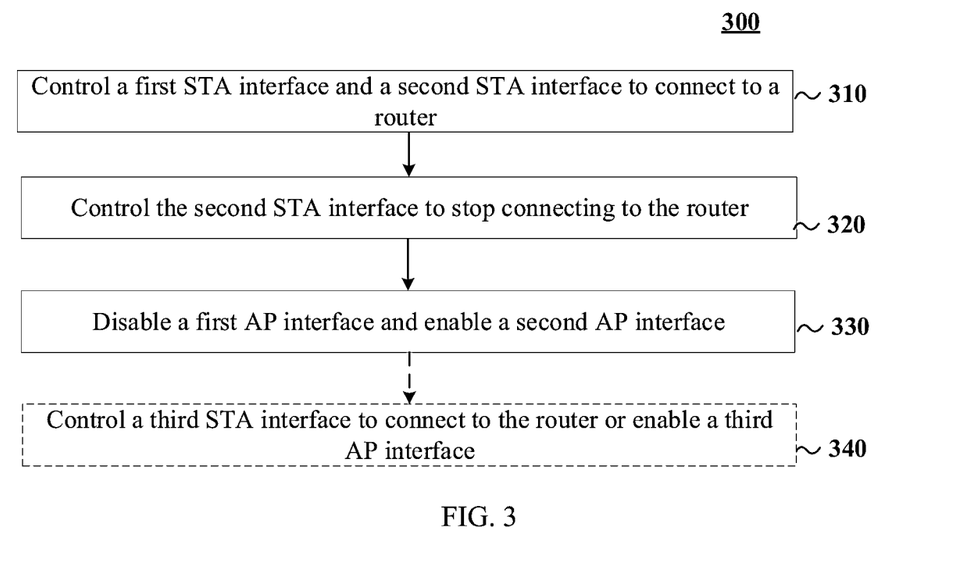
FIG. 3 shows a flowchart of a method of operating a wireless extender in a wireless frequency band according to an embodiment of the present disclosure.

In the above embodiments described with a reference to FIGS. 2 and 3, it is assumed that the WDS mode is not enabled in the router or the wireless extender, and the data transmission or communication is performed by using 3 addresses, namely a destination address (DA), a source address (SA) and a basic service set identifier (BSSID).

If the WDS mode is enabled in routers and wireless extenders, wireless connections can be established among the routers and wireless extenders, and the coverage of wireless network can be expanded. As described above, there is no effective approach at present for wireless extenders in the WDS mode to establish connections with each other automatically. Furthermore, in the WDS mode, if the one or more stations roam in the wireless environment, there is no effective approach at present to ensure uninterrupted service for a station, which for example switches from communicating data with the router to communicating data with a wireless extender during the roaming.

The present disclosure also aims to solve the problems related to the WDS mode and roaming scenario. The following descriptions will be made with reference to FIG. 4 and FIG. 5. It is shown a schematic diagram 400 of a scenario to which an embodiment of the present disclosure can be applied in FIG. 4, and it is shown a flowchart of a method 500 of operating a wireless extender in a wireless frequency band according to an embodiment of the present disclosure. The method 500 in FIG. 5 can be performed by the wireless extender 1 or wireless extender 2 in FIG. 4. It will be appreciated by the skilled in the art that a wireless extender in the upper level is viewed by another wireless extender in the lower level as a router. Therefore, the wireless extender 1 is viewed by the wireless extender 2 as a router. It will also be appreciated by the skilled in the art that although only 2 wireless extenders are shown in FIG. 4, there may be more than 2 wireless extenders in the wireless environment.

It should be noted that the wireless frequency band in which the wireless extender 1 and wireless extender 2 are operating is assumed to be 5 GHz frequency band in the context for ease of illustration and description, and the skilled can understand that the wireless frequency band can also be the 6 GHz frequency band or another frequency band, and the description regarding the 5 GHz frequency band can also apply to the 6 GHz frequency band or another frequency band. In the context of 5 GHz frequency band, the wireless extender 1/wireless extender 2 may comprise a first radio operating in a first range of frequencies of the wireless frequency band, shown as 5G1 in FIG. 4. The wireless extender 1/wireless extender 2 may also comprise a second radio operating in a second range of frequencies of the wireless frequency band, shown as 5G2 in FIG. 4. The first range of frequencies, 5G1, may comprise Unlicensed National Information Infrastructure (UNII) radio bands UNII-1 and UNII-2, for example, channels 36 to 64, as shown in FIG. 1. The second range of frequencies, 5G2, may comprise UNII radio bands UNII-2e and UNII-3, for example, channels 100 to 165, as shown in FIG. 1.

Figure 4:
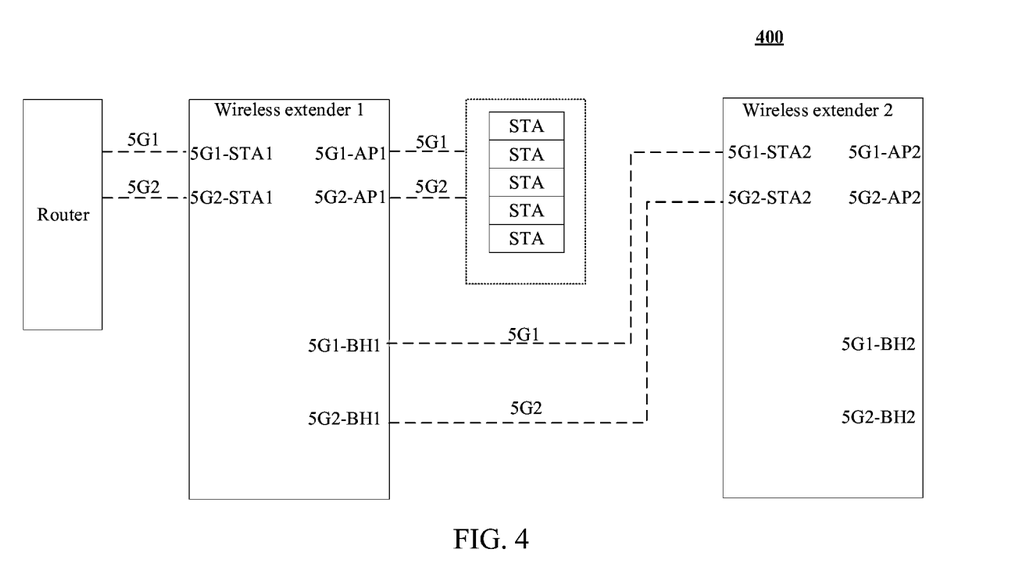
FIG. 4 shows a schematic diagram of a scenario to which an embodiment of the present disclosure can be applied.

As shown in in FIG. 4, the first radio of the wireless extender 1 may comprise a first STA interface, shown as 5G1-STA1 in FIG. 4, for connection to an upper node. The upper node may be, for example, the router as shown in FIG. 4. The first radio of the wireless extender 1 may also comprise a first AP interface, shown as 5G1-AP1 in FIG. 4, for connection to a lower node. Similarly, the second radio of the wireless extender 1 may comprise a second STA interface, shown as 5G2-STA1 in FIG. 4, for connection to the upper node, and a second AP interface, shown as 5G2-AP1 in FIG. 4, for connection by the lower node. The lower node may be, for example, one or more stations (STAs) as shown in FIG. 4. Each of the one or more stations may be any suitable Wi-Fi enabled wireless device including, for example, a cell phone, personal digital assistant (PDA), tablet device, laptop computer, or the like. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Similarly, the first radio of the wireless extender 2 may comprise a first STA interface, shown as 5G1-STA2 in FIG. 4, for connection to an upper node. The upper node may be, for example, the wireless extender 1 as shown in FIG. 4. The first radio of the wireless extender 2 may also comprise a first AP interface, shown as 5G1-AP2 in FIG. 4, for connection to a lower node. The second radio of the wireless extender 2 may comprise a second STA interface, shown as 5G2-STA2 in FIG. 4, for connection to the upper node, and a second AP interface, shown as 5G2-AP2 in FIG. 4, for connection by the lower node. The lower node may be, for example, one or more stations (STAs) (not shown). As further shown in FIG. 4, the first radio of the wireless extender 1 may also comprise a first backhaul interface, shown as 5G1-BH1 in FIG. 4, for connection to a lower node, which lower node may be, for example, the wireless extender 2 as shown in FIG. 4. Similarly, the second radio of the wireless extender 1 may also comprise a second backhaul interface, shown as 5G2-BH1 in FIG. 4, for connection to the lower node (for example, the wireless extender 2 as shown in FIG. 4). The first radio of the wireless extender 2 may also comprise a first backhaul interface, shown as 5G1-BH2 in FIG. 4, for connection to a lower node (not shown). Similarly, the second radio of the wireless extender 2 may also comprise a second backhaul interface, shown as 5G2-BH2 in FIG. 4, for connection to the lower node (not shown). Each of the first backhaul interface and the second backhaul interface can be used for backhaul connection by a lower node, for example, another wireless extender. The method 500 can performed by the wireless extender 1 or the wireless extender 2 in FIG. 4. The following description will be made by referring to elements of the wireless extender 1, and the same description can also apply to elements of the wireless extender 2.

It should be noted that the following description mainly focuses on how the first and second radios of the wireless extender 1 or the wireless extender 2 function so as to support the WDS mode and station roaming, the skilled in the art can understand that the wireless extender 1 or the wireless extender 2 can also include a third radio operating in another frequency band different from the frequency bands in which the first and second radios operates, and the illustration and description regarding the third radio will be omitted in the following for conciseness and not obscuring operations on the first and second radios.

Figure 5:
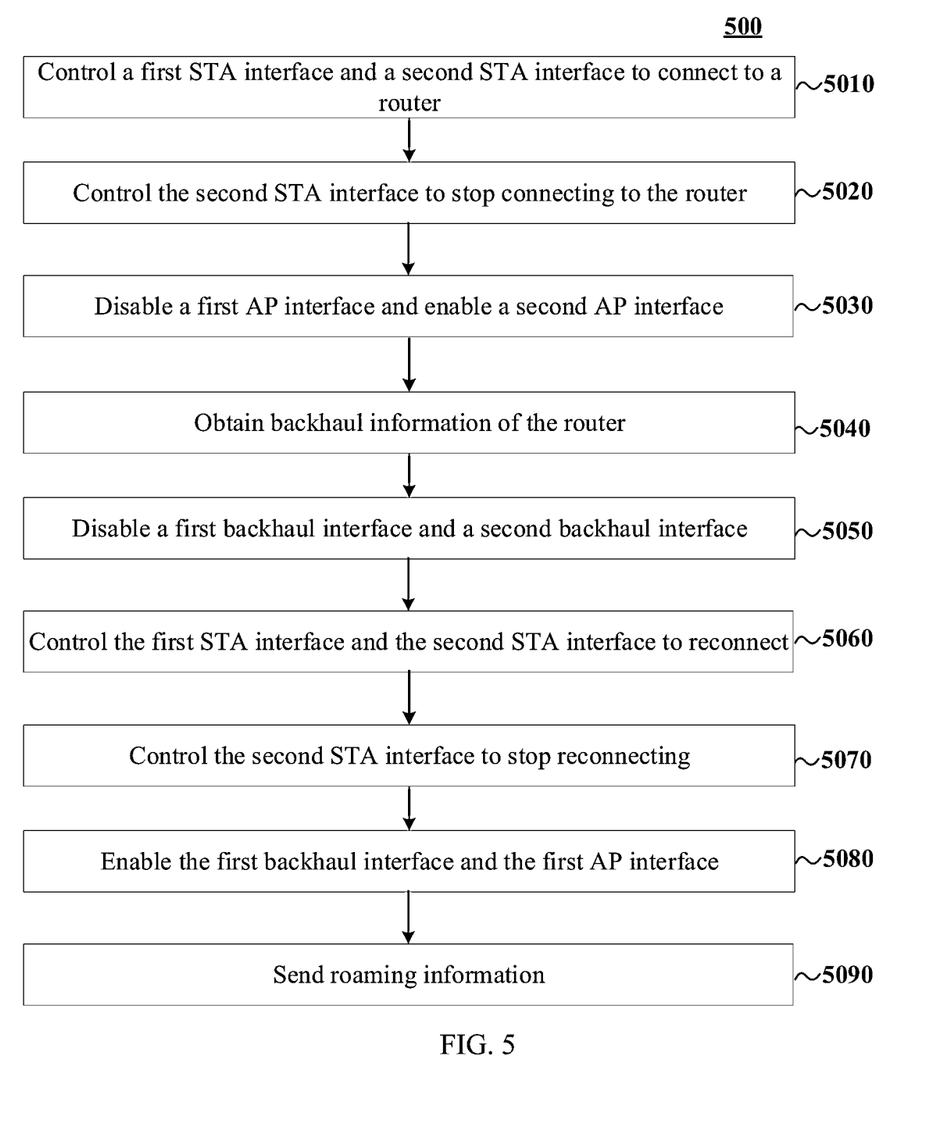
FIG. 5 shows a flowchart of a method of operating a wireless extender in a wireless frequency band according to an embodiment of the present disclosure.

Steps 5010 to 5030 are similar to steps 310 to 330, aiming to establish a connection between the router and the wireless extender 1 and a connection between the wireless extender 1 and one or more stations, and details are omitted for conciseness.

At step 5040, backhaul information of the router can be obtained. If the WDS mode is enabled in the router, there will be backhaul information which can be obtained by the wireless extender 1 through its connection with the router via the first STA interface (5G1-STA1).

At step 5050, the first backhaul interface of the first radio (5G1-BH1) and the second backhaul interface of the second radio (5G2-BH1) can be disabled. At this stage, the wireless extender 1 has not completed the configuration for the WDS mode, and therefore is not ready to be used by another wireless extender as a router. The first backhaul interface of the first radio (5G1-BH1) and the second backhaul interface of the second radio (5G2-BH1) are disabled so that no other wireless extenders are connected at this stage.

At step 5060, the first STA interface (5G1-STA1) and the second STA interface (5G2-STA1) can be controlled to reconnect to the router using the backhaul information obtained at step 5040. The backhaul information obtained at step 5040 may comprise another service set identifier (SSID) and encryption credential for the reconnection, the another service set identifier (SSID) and encryption credential are different from the ones used at step 5010.

At step 5070, if it is determined that the first STA interface (5G1-STA1) has reconnected to the router using the backhaul information, the second STA interface (5G2-STA1) can be controlled to stop reconnecting to the router. On the other hand, if it is determined that the second STA interface (5G2-STA1) has reconnected to the router using the backhaul information, the first STA interface (5G1-STA1) can be controlled to stop reconnecting to the router. Once it is determined one STA interface among the two STA interfaces has connected to the router, the connected STA interface can be used for the upper communication with the router. The other STA interface, which has not connected to the router, no longer needs to try to connect to the router, and therefore can be controlled to stop connecting to the router.

In some embodiments, both the first STA interface (5G1-STA1) and the second STA interface (5G2-STA1) may have connected to the router. In this case, one of the first STA interface (5G1-STA1) and the second STA interface (5G2-STA1) can be controlled to disconnect from the router.

At step S080, if it is the first STA interface (5G1-STA1) which has reconnected to the router, the first backhaul interface (5G1-BH1) can be enabled, and if it is the second STA interface (5G2-STA1) which has reconnected to the router, the second backhaul interface (5G2-BH1) can be enabled. Since the wireless extender 1 has reconnected to the router, it can be used by another wireless extender (for example wireless extender 2) as a router at this stage, and a corresponding backhaul interface is enabled for the another wireless extender to connect. If the first range of frequencies is used by the wireless extender 1 for upper communication with the router, the first range of frequencies should also be used by the wireless extender 2 for upper communication with the wireless extender 1 (viewed as a router by wireless extender 2), therefore, the first backhaul interface (5G1-BH1) can be enabled. On the other hand, if the second range of frequencies is used by the wireless extender 1 for upper communication with the router, the second range of frequencies should also be used by the wireless extender 2 for upper communication with the wireless extender 1 (viewed as a router by wireless extender 2), therefore, the second backhaul interface (5G2-BH1) can be enabled.

The first AP interface (5G1-AP1), which is disabled at step 5030, can be enabled at step 5080. As described above, one or more stations may roam in the wireless environment, for example, a first station may switch from communicating data with the router to communicating data with the wireless extender 1 during the roaming. According previous steps 5010-5030, the wireless extender 1 may communicate data with the router through a first channel in the first range of frequencies and communicate data with one or more stations through a second channel in the second range of frequencies (via 5G2-AP1). The first station is initially connected to the router and using the first channel for data communication or transmission. At a certain time, the first station may roam to a different position where it is better for the first station to connect to the wireless extender 1 for subsequent data communication. However, since the wireless extender 1 communicates data with one or more stations through the second channel (via 5G2-AP1) and the first AP interface (5G1-AP1) is disabled, the first station may not be able to successfully connect to the wireless extender 1, and there will be an interruption of service for the first station. Therefore, the first AP interface (5G1-AP1) can be enabled at step 5080, so that the roaming first station may temporarily connect to the wireless extender 1 via the first AP interface and its data communication is not interrupted. In fact, at step 5080, it is aimed to make the first and second AP interfaces both enabled, so that data communication of a station which is connected to either the first AP interface or the second AP interface is not interrupted. As only the first AP interface (5G1-AP1) is disabled, and the second AP interface (5G2-AP1) is enabled at step 5030, only the first AP interface (5G1-AP1) needs to be enabled at step 5080.

As further shown in FIG. 5, method 500 may further comprise a step 5090. At step 5090, if it is the first STA interface (5G1-STA1) which has reconnected to the router, roaming information can be sent to the first station described above which is connected to the first AP interface (5G1-AP1), to request the first station to connect to the second AP interface (5G2-AP1). As described above, the wireless extender may use different ranges of frequencies of the wireless frequency band for communicating with the router and one or more stations respectively so as to improve frequency band utilization rate as well as the forwarding rate of the wireless extender. Therefore, in the case that the first range of frequencies is used for upper communication, although the roaming first station may temporarily connect to the wireless extender 1 via the first AP interface so that its data communication is not interrupted at step 5080, it is preferred that the roaming first station ultimately switch to operate in the second range of frequencies, which is a better choice for wireless extender 1 to use for lower communication. The roaming information sent to the first station can be in the form of 802.11 messages.

It should be noted that although it is described above that the station to be sent the roaming information is the first station, it is not intended to indicate only one station, but to indicate at least one station. In fact, there may be one or more stations which are connected to the first AP interface, and the roaming information are sent to the one or more stations to request them to connect to the second AP interface.

Alternatively, if it is the second STA interface (5G2-STA1) which has reconnected to the router, roaming information can be sent to a first station which is connected to the second AP interface (5G2-AP1) at step 5090, to request the first station to connect to the first AP interface (5G1-AP1).

Similarly, although it is described above that the station to be sent the roaming information is the first station, it is not intended to indicate only one station, but to indicate at least one station. In fact, there may be one or more stations which are connected to the second AP interface, and the roaming information are sent to the one or more stations to request them to connect to the first AP interface.

In the WDA mode, the data transmission or communication is performed by using 4 addresses, namely a destination address (DA), a source address (SA), a transmitter address (TA) and a receiver address (RA).

According to embodiments of the present disclosure, the wireless extender can establish a connection with the router automatically, which is particularly useful in the scenario that a channel used by the router changes and the wireless extender is in turn disconnected from the router or in the scenario that the wireless extender hasn't initially connected to the router, and reduces the burdens of the user for manually establishing the connection. In addition, the wireless extender can support the scenario of WDS mode and station roaming, enabling wireless extenders in the WDS mode to establish connections with each other automatically and ensuring uninterrupted service for a station which undergoes roaming. Besides, the wireless extender can use different ranges of frequencies of the wireless frequency band for communicating with the router and one or more stations respectively, which improves frequency band utilization rate and the forwarding rate of the wireless extender.

In the embodiments described above with a reference to FIG. 5, the wireless extender 1 may firstly connect to the router based on a SSID and an encryption credential of the router, and then reconnect to the router based on the backhaul information to support the WDS mode. In another scenario, the wireless extender 1 may directly connect to the router based on the backhaul information to support the WDS mode. The following description will be made with reference to FIG. 4 and FIG. 6 to describe the method to be used in this scenario.

Figure 6:
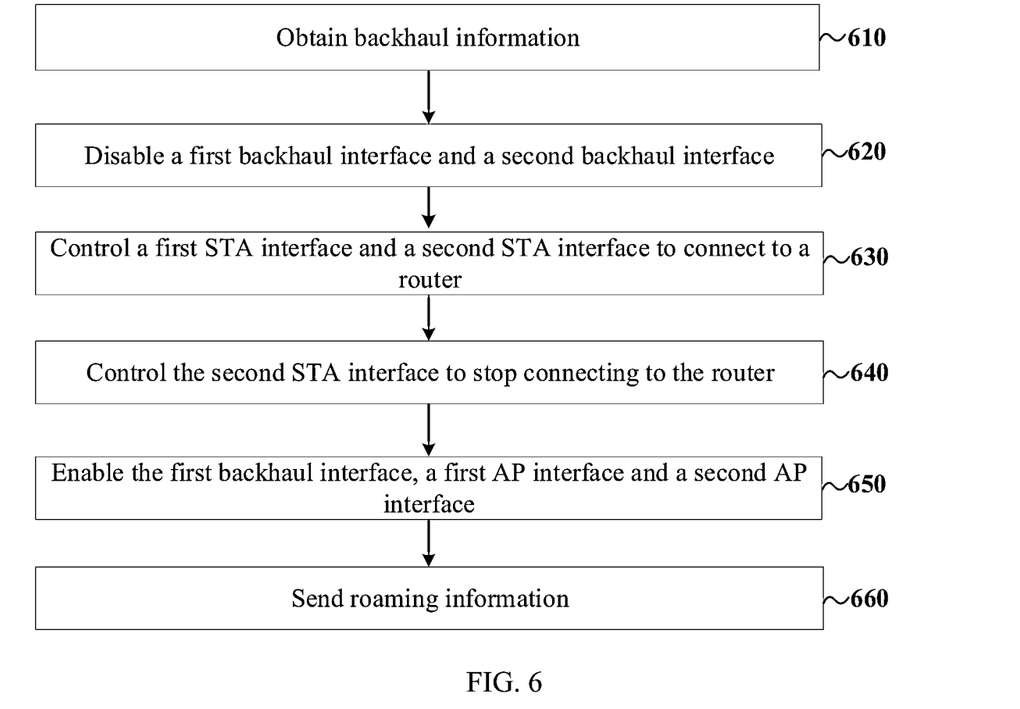
FIG. 6 shows a flowchart of a method of operating a wireless extender in a wireless frequency band according to an embodiment of the present disclosure.

It is shown a flowchart of a method 600 of operating a wireless extender in a wireless frequency band according to an embodiment of the present disclosure in FIG. 6. The method 600 can be performed by the wireless extender 1 or wireless extender 2 in FIG. 4. The following description will be made by referring to elements of the wireless extender 1, and the same description can also apply to elements of the wireless extender 2.

At step 610, backhaul information recorded in the wireless extender 1 can be obtained. For example, the wireless extender 1 and the wireless extender 2 as shown in FIG. 4 as well as some other wireless extenders not shown in FIG. 4 may be assigned within one group and they may each record the same backhaul information for establishing connection with an upper node (such as the router) and supporting the WDS mode. The recorded backhaul information can be used by each wireless extender to connect to an upper node which is viewed by the respective wireless extender as a router.

At step 620, the first backhaul interface of the first radio (5G1-BH1) and the second backhaul interface of the second radio (5G2-BH1) can be disabled. At this stage, the wireless extender 1 has not completed the configuration for the WDS mode, and therefore is not ready to be used by another wireless extender as a router. The first backhaul interface of the first radio (5G1-BH1) and the second backhaul interface of the second radio (5G2-BH1) are disabled so that no other wireless extenders are connected at this stage. Step 620 is similar to step 5060. In addition, although step 620 is shown in FIG. 6 as following step 610, it can be performed before or in parallel with step 610.

At step 630, the first STA interface of the first radio (5G1-STA1) and the second STA interface of the second radio (5G2-STA1) can be controlled to connect to a router using the backhaul information obtained at step 610, so that the wireless extender can establish a connection with the router automatically. The backhaul information obtained at step 630 may comprise a SSID and encryption credential of the router, which can be used by the wireless extender 1 for the connection.

At step 640, the second STA interface of the second radio (5G2-STA1) can be controlled to stop connecting to the router in response to determining that the first STA interface of the first radio (5G1-STA1) has connected to the router using the backhaul information. Once it is determined one STA interface (in this example, 5G1-STA1) among the two STA interfaces has connected to the router, the connected STA interface (in this example, 5G1-STA1) can be used for the upper communication with the router. The other STA interface (in this example, 5G2-STA1), which has not connected to the router, no longer needs to try to connect to the router, and therefore can be controlled to stop connecting to the router.

In some embodiments, both the first STA interface (5G1-STA1) and the second STA interface (5G2-STA1) may have connected to the router. In this case, one of the first STA interface (5G1-STA1) and the second STA interface (5G2-STA1) can be controlled to disconnect from the router.

At step 650, the first backhaul interface (5G1-BH1) can be enabled. Since the wireless extender 1 has connected to the router, it can be used by another wireless extender (for example wireless extender 2) as a router at this stage, and a corresponding backhaul interface is enabled for the another wireless extender to connect. Since the first range of frequencies is used by the wireless extender 1 for upper communication with the router, the first range of frequencies should also be used by the wireless extender 2 for upper communication with the wireless extender 1 (viewed as a router by wireless extender 2), therefore, the first backhaul interface (5G1-BH1) can be enabled.

In addition, at step 650, the first AP interface (5G1-AP1) and the second AP interface (5G2-AP1) can also be enabled. As described above, one or more stations may roam in the wireless environment, for example, one or more stations may switch from communicating data with the router to communicating data with the wireless extender 1 during the roaming. The one or more stations may be initially connected to the router and using a channel in the first range of frequencies for data communication or transmission. At a certain time, the one or more stations may roam to a different position where it is better for the one or more stations to connect to the wireless extender 1 for subsequent data communication. Although it is preferred that the one or more stations use a channel in the second range of frequencies for data communication or transmission with the wireless extender 1 since the first range of frequencies is used by the wireless extender 1 for upper communication, the wireless extender 1 should still have both the first AP interface (5G1-AP1) and the second AP interface (5G2-AP1) enabled so that service for the one or more stations is not uninterrupted. In another scenario, one or more stations may be connected to no devices initially, and it is intended that the one or more stations can connect to the wireless extender 1 via either the first range of frequencies or the second range of frequencies when the one or more stations need to perform data communication or transmission. In this case, the wireless extender 1 should also have its first AP interface (5G1-AP1) and second AP interface (5G2-AP1) enabled, so that the one or more stations may experience unlimited connection.

As described above, it is preferred that one or more stations connected to the wireless extender 1 via the first AP interface (and therefore, use the first range of frequencies for data communication or transmission) ultimately use the second range of frequencies for data communication or transmission, so as to improve frequency band utilization rate and the forwarding rate of the wireless extender. Therefore, as further shown in FIG. 6, method 600 may comprise a step 660. At step 660, roaming information can be sent to one or more stations which are connected to the first AP interface (5G1-AP1), to request the one or more stations to connect to the second AP interface (5G2-AP1), so that the one or more stations can use the second range of frequencies for data communication or transmission. The roaming information sent to the one or more stations can be in the form of 802.11 messages.

According to embodiments of the present disclosure, the wireless extender can establish a connection with the router automatically in the WDS mode and ensure uninterrupted service for a station which undergoes roaming or ensure a station to experience unlimited initial connection. Besides, the wireless extender can use different ranges of frequencies of the wireless frequency band for communicating with the router and one or more stations respectively, which improves frequency band utilization rate and the forwarding rate of the wireless extender.

Figure 7:
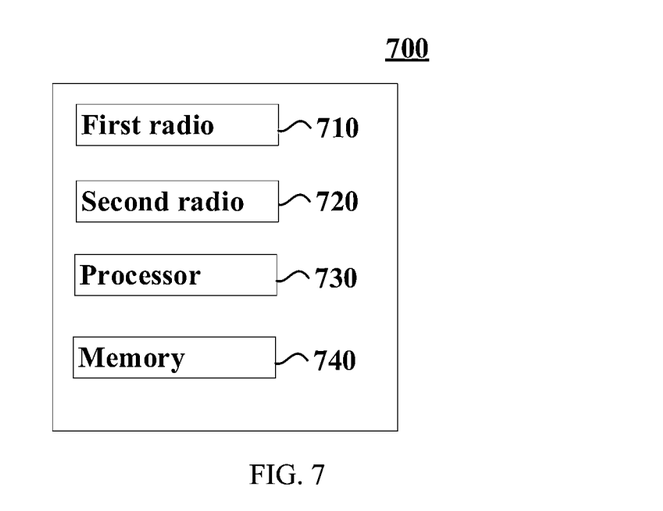
FIG. 7 shows an exemplary block diagram illustrating a wireless extender according to an embodiment of the present disclosure.

FIG. 7 is an exemplary block diagram illustrating a wireless extender 700 according to an embodiment of the present disclosure. It should be noted that the wireless extender 700 depicted in FIG. 7 can be used to perform the operations of operating a wireless extender in a wireless frequency band, for example, respective method 300 or method 500 or method 600 as described above.

As shown in FIG. 7, the wireless extender 700 can comprise a first radio 710 operating in a first range of frequencies of the wireless frequency band, and a second radio 720 operating in a second range of frequencies of the wireless frequency band. The wireless extender 700 can further comprise one or more processors 730 and a memory 740. The one or more processors 730 are communicatively coupled with the memory 740 and configured to perform the methods discussed above. Although not shown in FIG. 7, the wireless extender 700 may further comprise a third radio operating in another wireless frequency band different from the wireless frequency band in which the first radio 710 and the second radio 720 operate.

Examples of the one or more processors 730 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The one or more processors 730 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 740.

The memory 740 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 740 may reside in the one or more processors 730, external to the one or more processors 730, or distributed across multiple entities including the one or more processors 730. The memory 740 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for operating a wireless extender in a wireless frequency band is disclosed. As an example, the computer program product comprises a non-transitory computer readable storage medium having program instructions embodied therewith, and the program instructions are executable by a processor of the wireless extender. When executed, the program instructions cause the processor to perform one or more of the described procedures above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including ", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method of operating a wireless extender in a wireless frequency band, the wireless extender comprising a first radio operating in a first range of frequencies of the wireless frequency band and a second radio operating in a second range of frequencies of the wireless frequency band, the method comprising:
   controlling a first station (STA) interface of the first radio and a second STA interface of the second radio to connect to a router in response to determining that a connection state of the first STA interface and a connection state of the second STA interface are both disconnected;
   controlling the second STA interface to stop connecting to the router in response to determining that the first STA interface has connected to the router; and
   disabling a first access point (AP) interface of the first radio and enabling a second AP interface of the second radio.

2. The method of claim 1, further comprising:
   controlling the second STA interface to disconnect from the router in response to determining that both the first STA interface and the second STA interface have connected to the router.

3. The method of claim 1, further comprising:
   obtaining backhaul information of the router;
   disabling a first backhaul interface of the first radio and a second backhaul interface of the second radio;
   controlling the first STA interface and the second STA interface to reconnect to the router using the backhaul information;
   controlling the second STA interface to stop reconnecting to the router in response to determining that the first STA interface has reconnected to the router using the backhaul information; and
   enabling the first backhaul interface and the first AP interface.

4. The method of claim 3, further comprising:
   sending roaming information to one or more stations connected to the first AP interface to request the one or more stations to connect to the second AP interface.

5. The method of claim 1, further comprising:
   obtaining backhaul information of the router;
   disabling a first backhaul interface of the first radio and a second backhaul interface of the second radio;
   controlling the first STA interface and the second STA interface to reconnect to the router using the backhaul information;
   controlling the first STA interface to stop reconnecting to the router in response to determining that the second STA interface has reconnected to the router using the backhaul information; and
   enabling the second backhaul interface and the first AP interface.

6. The method of claim 5, further comprising:
   sending roaming information to one or more stations connected to the second AP interface to request the one or more stations to connect to the first AP interface.

7. The method of claim 1, wherein the wireless frequency band is a 5 GHz wireless frequency band or a 6 GHz wireless frequency band.

8. The method of claim 1, wherein the first range of frequencies comprises Unlicensed National Information Infrastructure (UNII) radio bands UNII-1 and UNII-2, and wherein the second range of frequencies comprises UNII radio bands UNII-2e and UNII-3.

9. The method of claim 1, wherein the wireless extender comprises a third radio operating in another wireless frequency band and the method further comprises:
   controlling a third STA interface of the third radio to connect to the router or enabling a third AP interface of the third radio.

10. The method of claim 3, wherein each of the first backhaul interface and the second backhaul interface is used for backhaul connection by another wireless extender.

11. A wireless extender configured to operate in a wireless frequency band, comprising:
    a first radio operating in a first range of frequencies of the wireless frequency band;
    a second radio operating in a second range of frequencies of the wireless frequency band;
    one or more processors;
    a memory coupled to at least one of the processors; and
    a set of computer program instructions stored in the memory, which, when executed by at least one of the processors, perform the following actions:
       controlling a first station (STA) interface of the first radio and a second STA interface of the second radio to connect to a router in response to determining that a connection state of the first STA interface and a connection state of the second STA interface are both disconnected;
       controlling the second STA interface to stop connecting to the router in response to determining that the first STA interface has connected to the router; and
       disabling a first access point (AP) interface of the first radio and enabling a second AP interface of the second radio.

12. The wireless extender of claim 11, wherein the processor is further configured to:
    control the second STA interface to disconnect from the router in response to determining that both the first STA interface and the second STA interface have connected to the router.

13. The wireless extender of claim 11, wherein the processor is further configured to:
    obtain backhaul information of the router;
    disable a first backhaul interface of the first radio and a second backhaul interface of the second radio;
    control the first STA interface and the second STA interface to reconnect to the router using the backhaul information;

control the second STA interface to stop reconnecting to the router in response to determining that the first STA interface has reconnected to the router using the backhaul information; and enable the first backhaul interface and the first AP interface.

14. The wireless extender of claim 13, wherein the processor is further configured to:

send roaming information to one or more stations connected to the first AP interface to request the one or more stations to connect to the second AP interface.

15. The wireless extender of claim 11, wherein the processor is further configured to:

obtain backhaul information of the router;

disable a first backhaul interface of the first radio and a second backhaul interface of the second radio;

control the first STA interface and the second STA interface to reconnect to the router using the backhaul information;

control the first STA interface to stop reconnecting to the router in response to determining that the second STA interface has reconnected to the router using the backhaul information; and enable the second backhaul interface and the first AP interface.

16. The wireless extender of claim 15, wherein the processor is further configured to:

send roaming information to one or more stations connected to the second AP interface to request the one or more stations to connect to the first AP interface.

17. The wireless extender of claim 11, wherein the wireless frequency band is a 5 GHz wireless frequency band or a 6 GHz wireless frequency band.

18. The wireless extender of claim 11, wherein the first range of frequencies comprises Unlicensed National Information Infrastructure (UNII) radio bands UNII-1 and UNII-2, and wherein the second range of frequencies comprises UNII radio bands UNII-2e and UNII-3.

19. The wireless extender of claim 13, wherein each of the first backhaul interface and the second backhaul interface is used for backhaul connection by another wireless extender.

20. A wireless extender configured to operate in a wireless frequency band, comprising:

a first radio operating in a first range of frequencies of the wireless frequency band;

a second radio operating in a second range of frequencies of the wireless frequency band;

one or more processors;

a memory coupled to at least one of the processors; and a set of computer program instructions stored in the memory, which, when executed by at least one of the processors, perform the following actions:

obtaining backhaul information recorded in the wireless extender;

disabling a first backhaul interface of the first radio and a second backhaul interface of the second radio;

controlling a first station (STA) interface of the first radio and a second STA interface of the second radio to connect to a router using the backhaul information;

controlling the second STA interface to stop connecting to the router in response to determining that the first STA interface has connected to the router using the backhaul information;

enabling the first backhaul interface, a first access point (AP) interface of the first radio and a second AP interface of the second radio; and sending roaming information to one or more stations connected to the first AP interface to request the one or more stations to connect to the second AP interface.

* * * * *